June 18, 1935. M. C. BATSEL 2,005,068
SOUND REPRODUCING APPARATUS
Filed June 15, 1931
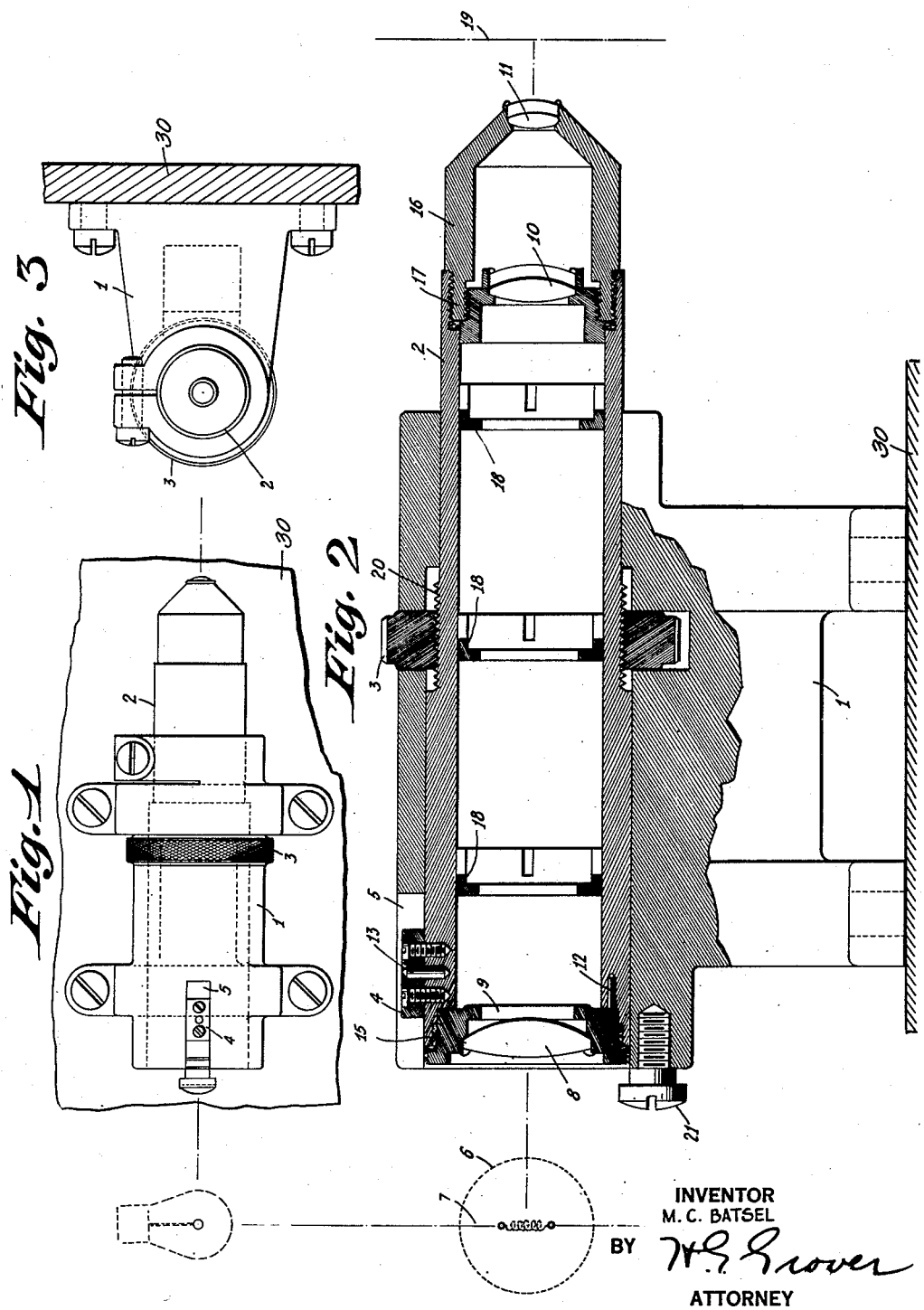
INVENTOR
M. C. BATSEL
BY
ATTORNEY Patented June 18, 1935

2,005,068

UNITED STATES PATENT OFFICE 2,005,068

SOUND REPRODUCING APPARATUS

Max Carter Batsel, Yonkers, N. Y., assignor to Radio Corporation of America, a corporation of Delaware Application June 15, 1931, Serial No. 544,439

6 Claims. (Cl. 88—24)

This invention relates to sound reproducing apparatus and more particularly to optical systems of the variety thereof wherein a narrow line of light is focussed upon a sound-track.

Sound recording and reproducing apparatus wherein a narrow line or point of light is focussed upon the sound record is well known in the art and has been in use for many years, and more recently the particular variety thereof wherein the sound record is optically produced in a narrow line upon a flexible film, wherefrom the sound is reproduced by means of an optical system and a photo-electric cell, has become of commercial importance.

In this latter variety of system, both in recording and in reproducing, an optical system is required to focus upon the film a linear luminous image having a width of the order of magnitude of 0.5 to 1 thousandth of an inch and having a length of an order of magnitude of eight to ten hundredths of an inch. This optical system must obviously be focussed with extreme accuracy in order to keep the image within the required dimensions, and at the same time the direction of the line image must be maintained accurately transverse of the sound-track within limits at least as exacting as those of dimensions and focus.

The present invention provides a mounting for an optical system which insures an extremely accurate fixation of the linear image in its transverse relation or azimuth and at the same time facilitates focussing of the image without disturbing the first adjustment. This invention also prevents the azimuth adjustment being displaced either inadvertently or purposely by persons not competent to correct any misadjustment therein and provides a focussing means which is readily adjustable but does not become displaced through vibration.

In the performance of this invention I take advantage of the facts that although the sound-track is extremely narrow and the transverse adjustment of the optical system is limited to within a few ten-thousandths of an inch, the sound-track is always exactly longitudinal of the film, the linear image must always be perpendicular to the longitudinal axis of the sound-track, and there is a considerable length of the film extended through the projector either in exact parallelism with a center-plate along which the mechanism is assembled or in a similar predetermined plane of movement which is in a certain relation to other fixed parts to which the optical system may be attached.

One object of this invention is to provide a mounting for such an optical system wherein the azimuth adjustment is permanently fixed.

Another object of the invention is to provide such a mounting wherein the azimuth adjustment is accurately defined relative to the longitudinal axis of the sound-track.

Another object of the invention is to provide such a mounting wherein the azimuth adjustment cannot be readily disturbed.

Another object of the invention is to provide such a mounting from which the optical system may be readily removed and in which it may be readily replaced without disturbing the adjustment.

Another object of the invention is the provision of such a mounting which may be readily assembled to the rest of the machine without tedious and expensive adjustments.

Another object of the invention is the provision of such a mounting which may be bodily affixed to a sound-reproducing mechanism and which will necessarily thereupon locate the linear image in predetermined angular relation to the sound-track.

Further objects of the invention will be apparent to those skilled in the art from the following specification and from inspection of the appended drawing, wherein,—

Fig. 1 is a top view of my mounting and optical system, that is, it is a top view as the mounting would stand upon a support but is a side view as the mounting would be affixed to a vertical center-plate 30.

Fig. 2 is a longitudinal section taken perpendicularly to Fig. 1.

Fig. 3 is a view from the right-hand end of Figs. 1 and 2.

The body of the device consists of the member 1, preferably a bronze die-casting, in which the tube 2 containing the optical system is longitudinally movable under control of the knurled ring 3 while it is maintained in exact angular position by the block 4 sliding accurately in the slot 5 in the body 1.

The body 1 is preferably provided with a flat base as shown, or is provided with feet or equivalent means which cause it to always be in predetermined relation to the center-plate 30 about which most motion-picture machines or sound heads are assembled. If the machine is of a type not provided with a center-plate the shape of the body 1 must be modified to properly cooperate with such framework as the machine is provided with.

As is well known to those skilled in the art, the film winds back and forth through sprockets, rollers, gates, etc., in any motion picture machine or sound head therefor or film phonograph, but the axis of the film remains always in a single plane or, in some instances, in a few different planes in predetermined relation, as otherwise the film could not be maintained upon the sprockets or run through the machine and a very slight deviation of any part from proper alignment will cause the film to jump the sprockets. Since the extent of film is relatively great and the size of the base of the body member 1 is also great relative to the size of the optical system, it will be apparent that the body member 1 will necessarily be in accurate angular relation to the sound-track.

It then remains to maintain this accurate angular relation through the small relatively movable parts to the image defining members of the optical system, which system is next described.

Light is preferably obtained from such a source as the incandescent lamp 6 which is provided with an elongated coil filament 7 having its axis parallel to the line image, but any other appropriate source may be used.

The light strikes the condenser lens 8 which is at such a distance that an image of the source is approximately focussed at the entrance pupil of the objective combination 10—11. Immediately adjacent to the condenser 8 is the slit 9, which is of such dimensions that the reduced image thereof produced by the objective combination 10—11 upon the film will be of proper size. This slit is fixed in definite relation to the tube 2 by the pin 12 which is in predetermined relation to the pin 13 and therefore to the block 4, and the circular body in which the slit is cut is fitted snugly into the end of the tube 2 and is cemented in place by appropriate material indicated at 15.

The objective elements 10 and 11 are mounted in a tubular body member 16 which is screwed and cemented into the tubular member 2 as indicated at 17.

The tube 2 is provided with the usual internal diaphragms 18 to prevent internal reflection.

The objective focusses an image of the slit 9 in the plane 19 where the film should be located.

It will be apparent to those acquainted with such apparatus that the position of the film perpendicularly to the face thereof in relation to the rest of the apparatus cannot be predetermined to the same degree of accuracy as the adjustment in azimuth, due to the flexibility of the film and the necessary manufacturing tolerances in the location of parts upon the center-plate above referrred to.

The optical system must therefore be adjustable longitudinally to focus the image upon the surface of the film. This is accomplished by making the tube 2 slidable longitudinally in the base member 1, the tube being obviously a snug sliding fit in the base. The tube is threaded at 20, and the ring 3 is threaded internally to correspond and fits rather snugly between the faces of a slot cut in the base member 1 as shown in the drawing. It will be apparent that rotation of the ring 3 will cause longitudinal movement of the tube 2 relative to the base 1. This movement is limited in the right-hand direction by the shoulder shown at the left end of the screwthread 20, and is limited in the opposite direction by the stop-screw 21.

The slot 5 in the base member 1 is positioned with relation to the plane of the base of the member to a degree of accuracy corresponding to the accuracy of azimuth adjustment required, and the block 4 is a snug sliding fit in this slot. The block 4 is therefore accurately positioned with relation to the longitudinal axis of the soundtrack and is also accurately positioned with relation to the hole in which the tube 2 slides. Since the slit 9 is in predetermined relation to the block 4 due to the pins 12 and 13 as described above, the slit 9 will be in the required accurate angular relation to the sound-track and will be retained permanently in such relation even though repeatedly adjusted as to focus by operation of the knurled ring 3.

Having described the principle of my invention and a specific structure including the invention which is at present the embodiment thereof which I prefer, I claim:

1. A mounting for optical systems including means forming a linear image in predetermined orientation relative to the body of the optical system for film-type phonographic apparatus including a center-plate, comprising a base member having a surface adapted to contact with the center-plate and thereby maintain the base member accurately parallel to the plane of the axis of the film and co-operating fixed means on said base and said optical system for maintaining an optical system of circular cross-section in predetermined oriented relation to the said base member.

2. A mounting for optical systems including means forming a linear image in predetermined orientation relative to the body of the optical system for film-type phonographic apparatus including a center-plate, comprising a base member having a surface adapted to contact with the center-plate and thereby maintain the base member accurately in the plane of the axis of the film and co-operating fixed means on said base and said optical system for maintaining the optical system in predetermined oriented relation to the said base member while permitting axial movement thereof.

3. Photophonographic apparatus including a mounting for an optical system having a tubular body and including means forming a linear image in predetermined orientation relative to the body of the optical system comprising a base, means for moving the system axially relative to said base, and co-operating fixed means on said base and said optical system for preventing rotation of the system relative to said base.

4. Film-type phonographic apparatus comprising an optical system adapted to focus a linear luminous image upon the film, means for moving the optical system axially to focus said image, and co-operating fixed means on the optical system and on the support therefor for maintaining the image in predetermined angular relation to the axis of the film.

5. Optical apparatus comprising a base member, a tube containing an optical system and movable axially relative to the base member, a member in said tube having a narrow transverse slit, means retaining said slitted member in fixed circumferential relation to said tube, and means in predetermined fixed relation to said retaining means and cooperating means on said base member for maintaining said slitted member in predetermined circumferential relation to said base member.

6. Apparatus of the class described including a base member consisting of a unitary casting having a relatively large flat surface adapted to contact with a center plate of the apparatus, thereby maintaining the said base member in predetermined angular relation to such center plate, an optical system including a tubular body and means forming a linear image in predetermined orientation relative to the body of the optical system and axially movable in said base member, a keyway in said base member in predetermined angular relation to the said flat surface thereof, and a key fixed on said optical system in predetermined relation to said image forming means and cooperating with said keyway, whereby the said optical system is maintained in predetermined angular relation to the said flat surface.

MAX CARTER BATSEL.